UNITED STATES PATENT OFFICE.

ARTHUR W. SWANBERG, OF MINNEAPOLIS, MINNESOTA, ASSIGNOR OF ONE-HALF TO FREDERICK C. FISK, OF WILLIAMSVILLE, NEW YORK.

LIQUID-FUEL COMPOSITION AND PROCESS OF MAKING THE SAME.

1,225,405.　　　　Specification of Letters Patent.　　Patented May 8, 1917.

No Drawing.　　Application filed June 23, 1916.　Serial No. 105,396.

*To all whom it may concern:*

Be it known that I, ARTHUR W. SWANBERG, a citizen of the United States, residing at Minneapolis, in the county of Hennepin and State of Minnesota, have invented certain new and useful Improvements in Liquid-Fuel Compositions and Processes of Making the Same, of which the following is a specification.

This invention relates to liquid fuel compositions and processes of making the same; and it comprises as a new composition of matter a permanent and stable liquid fuel for use in internal combustion engines and for other purposes containing petroleum oils, carbon bisulfid and anthracene; and it also comprises a method of making such liquid fuel wherein anthracene and carbon bisulfid are admixed with a petroleum oil, such as kerosene, in the presence of more or less moisture or water; all as more fully hereinafter set forth and as claimed.

As is well known, in the operation of internal combustion engines with the ordinary carbureter, the fuel must be more or less volatile in its nature or must contain volatile constituents. The ordinary gasolene of commerce is in large part heavy oil, being, as now made, practically everything which will distil from the crude or cracked oil at a temperature below 150° C. As so made, it contains some readily volatile oils and a large proportion of oils which are not readily volatile; the temperature of 150° C. being, of course, a relatively high one and one at which heavy oils distil over. In view of the high cost of gasolene many attempts have been made to substitute kerosene and other oils for gasolene; but with no great amount of success when using the ordinary type of carbureter. While kerosene will run an engine after the engine is hot, the engine ordinarily will not start with it; and in any event the combustion is attended with the development of much carbon and soot. Many propositions have been made for adding other and more volatile oils to kerosene, and the like for the purpose of making blended liquids operating well in the gas engine. These propositions however have not been attended with much success for the reason that the undesired properties of the kerosene persist in most of these mixtures.

I have found that I can produce a liquid which operates well in an internal combustion engine by admixing more or less carbon bisulfid with the kerosene. But this 2-component mixture is not permanent and is not wholly satisfactory in other respects since the kerosene still retains its soot and carbon depositing properties. The mixture is not permanent for the reason that the carbon bisulfid readily evaporates and leaves the mixture; and the vapor tension of such a mixture, even where it contains only two or three per cent. of the bisulfid, is quite high at ordinary temperatures. That is, the carbon bisulfid tends to evaporate away from the kerosene and the mixture therefore is not only not stable but it is also dangerous. Carbon bisulfid ignites at a lower temperature than most other materials and the vapors from such a mixture are therefore very prone to catch fire and explode. But I have found that I can secure the property of permanence in the mixture and diminish the vapor tension or unduly low flash point by the simple expedient of using a little anthracene. With the addition of anthracene the vapor tension of the carbon bisulfid is very much diminished and the mixture remains constant over long periods of time; or, in other words, the carbon bisulfid does not evaporate away freely as it does when mixed with kerosene alone. Also, and unexpectedly, I have found that in the presence of the anthracene the kerosene component of the mixture does not soot and deposit carbon as it does in most other mixtures.

And I have also found that a mixture of kerosene, carbon bisulfid and anthracene will tolerate the presence of a small amount of moisture or water without separation; and the presence of this amount of water in the mixture makes the combustion in the engine cylinder of a still cleaner character; that is in the presence of this slight amount of moisture, which does not exceed a per cent. or two, there is a still less tendency toward sooting and deposition of carbon.

As the anthracene component of my mixture I may use any commercial grade of anthracene, whether the pure crystallized material or the crude anthracene. I find however that the crude anthracene works as well as, or even better than, the purer stuff and I therefore prefer its use. I may of course use anthracene-rich materials, such as "anthracene oil."

In making my composition, I mix the anthracene, which may be powdered if desired, with the carbon bisulfid. The anthracene dissolves in the bisulfid. A little water may be added at the same time or the anthracene may be used wet. Any excess of water does no harm since the excess does not dissolve and may be separated. As stated, I find it advantageous to have a little water present in the final composition. The solution of anthracene in carbon bisulfid may be added directly to kerosene. In lieu of kerosene I may use light spindle oils or other petroleum distillates; but I find that the ordinary commercial kerosene does very well for my purposes.

While the proportions of materials which I use may be widely varied within the present invention, I find that a good preparation for use in the ordinary type of automobile engine with the ordinary types of carbureters is obtained by using for each gallon of finished material about two ounces of anthracene dissolved in six ounces of carbon bisulfid. This mixture may be made up to a gallon with ordinary kerosene. A preparation not so readily available in many engines may be made by dissolving an ounce of anthracene in three ounces of bisulfid and making up to a gallon as before. The exact proportion of bisulfid to kerosene used depends very largely upon the particular carbureter; some carbureters working better with a liquid containing a relatively large amount of bisulfid while others work better with a little less; and it also depends upon the weather. In cold weather more bisulfid is desired. In a general way however the best limits may be said to be between three and six ounces of bisulfid in the gallon with enough anthracene to hold the bisulfid in the solution. The amount of anthracene to be used similarly varies somewhat with the condition and the carbureter. The functions of the anthracene in the mixture are to restrain an undue vapor tension of the bisulfid and also to make the mixture homogeneous. In cold weather it is desirable to lessen somewhat the amount of anthracene relative to the amount of bisulfid. Ordinarily however I employ about one part of anthracene to every three parts of bisulfid. As stated, for general purposes, I find three to six ounces of bisulfid in the gallon with one to two ounces of anthracene about the best proportions.

The described preparation is distinguished by its permanence under exceptionally trying circumstances. A mixture made as described shows no separation when exposed to as low a temperature as $-30°$ F. and on the other hand, in spite of the great volatility of carbon bisulfid alone, the composition does not substantially change by short periods of exposure to heat as high as, say, 120° F. The flash point of the kerosene used was 111° F., and exposure to a temperature of 120° F. while it produced some diminution in the volume of the liquid, nevertheless did not prove injurious to the quality of the residue left after heating, it was still useful in the engine.

What I claim is:—

1. A liquid fuel for internal combustion engines and similar purposes comprising kerosene, anthracene and carbon bisulfid.

2. A liquid fuel for internal combustion engines and similar purposes comprising kerosene, anthracene, carbon bisulfid and as much water as the mixture will take up.

3. A liquid fuel for internal combustion engines and similar purposes comprising kerosene, carbon bisulfid and anthracene, the anthracene being present in the amount of about two ounces per gallon and the carbon bisulfid in the amount of about six ounces per gallon.

4. The process of making a liquid fuel for internal combustion engines and like purposes which comprises dissolving anthracene in carbon bisulfid and mixing the solution with kerosene.

5. The process of making a liquid fuel for internal combustion engines and like purposes which comprises mixing anthracene with carbon bisulfid in the presence of moisture and dissolving the solution so formed in kerosene.

In testimony whereof, I affix my signature hereto.

ARTHUR W. SWANBERG.